Dec. 3, 1935.                W. J. CONWAY                 2,022,881
                           LOADING MECHANISM
                        Filed Sept. 22, 1934          2 Sheets-Sheet 1
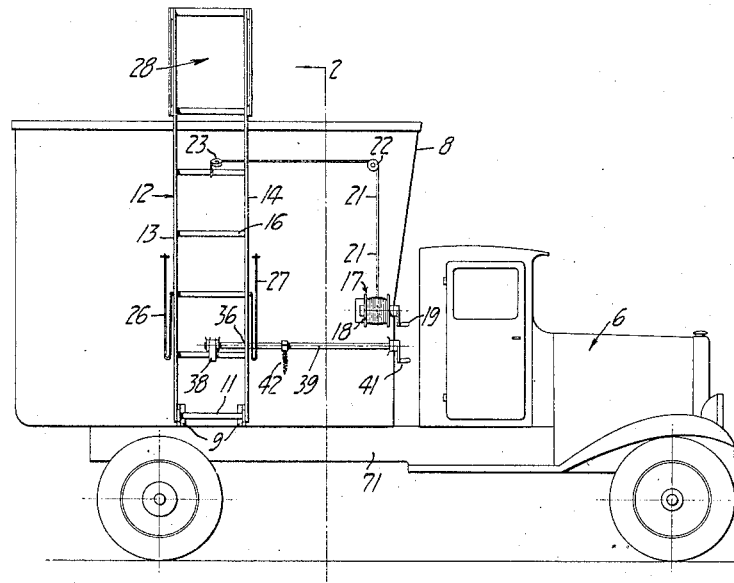
FIG_1_
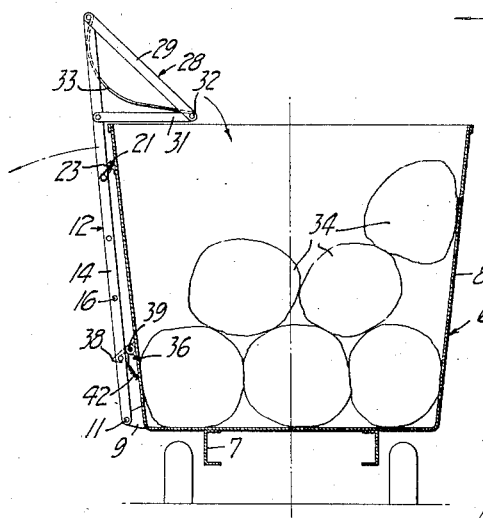
FIG_2_
FIG_3_
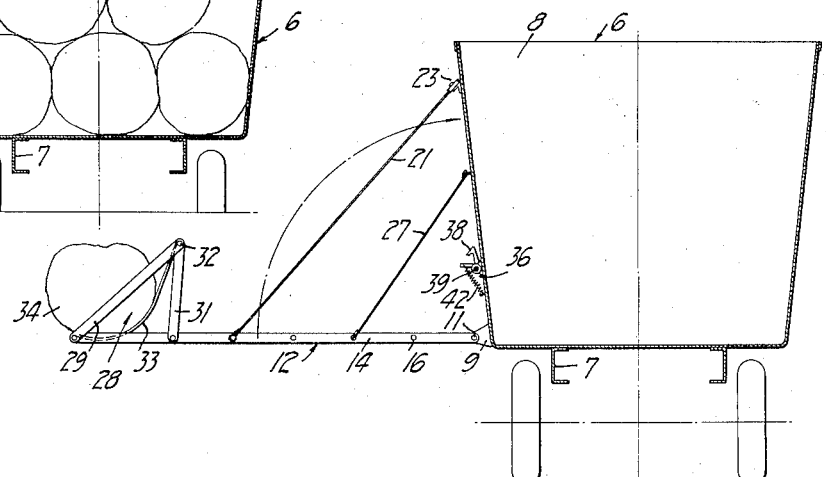
INVENTOR.
William J. Conway
BY
Marcus Lothrop
ATTORNEY.

Dec. 3, 1935.  W. J. CONWAY  2,022,881
LOADING MECHANISM
Filed Sept. 22, 1934  2 Sheets-Sheet 2
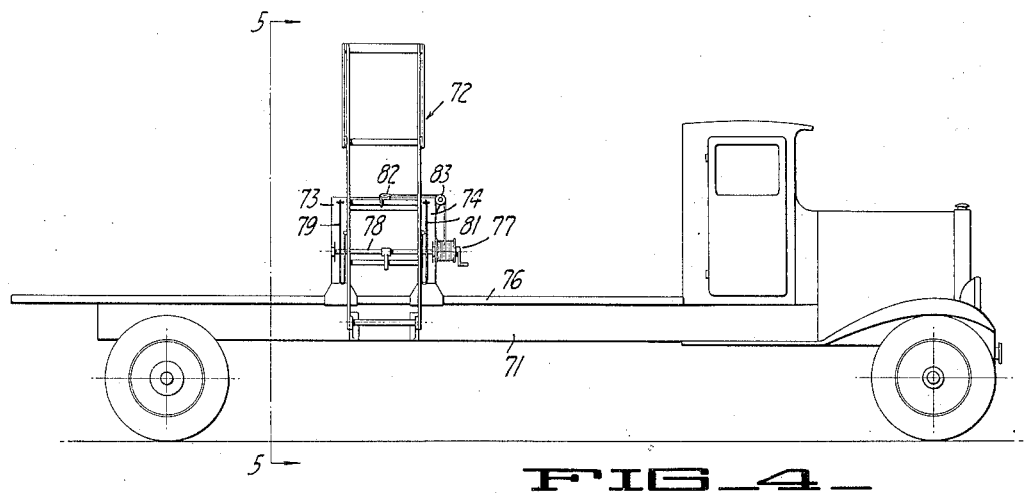
FIG_4_
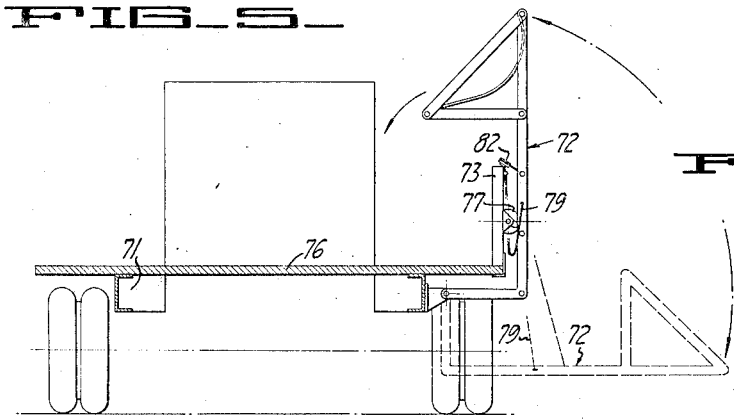
FIG_5_
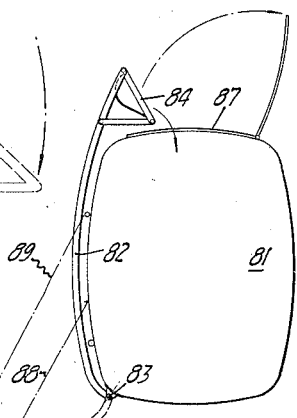
FIG_6_
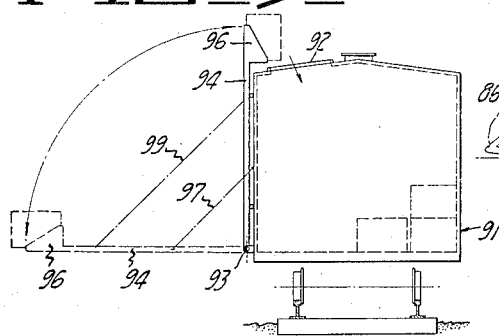
FIG_7_
INVENTOR.
William J. Conway
BY
Marcus Lothrop
ATTORNEY.

Patented Dec. 3, 1935

2,022,881

UNITED STATES PATENT OFFICE 2,022,881

LOADING MECHANISM

William J. Conway, San Francisco, Calif.

Application September 22, 1934, Serial No. 745,061

4 Claims. (Cl. 214—78)

My invention relates to means for facilitating the movement of goods, such as packages and bundles, from adjacent the ground level into the body of a relatively high vehicle such as a truck, car or airplane.

An object of my invention is to provide a loading mechanism which can form a substantially permanent part of a vehicle and which will be of considerable use in moving loads into the vehicle.

Another object of my invention is to provide a loading mechanism which will also discharge automatically into a vehicle.

A further object of my invention is to provide a loading mechanism which can be used as a ladder for inspection purposes.

Another object of my invention is to provide a loading mechanism which is very simple and economical to construct and operate.

A further object of the invention is to provide a loading mechanism which will be maintained in position despite jarring and vibration of the vehicle to which it pertains.

The foregoing and other objects are attained in the embodiment of the invention illustrated in the drawings, in which—

Fig. 1 is a side elevation of a vehicle such as a truck, carrying the loading mechanism of my invention in uppermost position.

Fig. 2 is a cross-section the plane of which is indicated by the line 2—2 of Fig. 1.

Fig. 3 is a view similar to Fig. 2 but showing the loading mechanism in lowermost position.

Fig. 4 is a side elevation of a modified form of installation on a truck, showing the mechanism in uppermost position.

Fig. 5 is a cross-section the plane of which is indicated by the line 5—5 of Fig. 4, showing the loading mechanism in lowermost and uppermost positions.

Fig. 6 is a transverse cross-section through an airplane fuselage, showing the loading mechanism of my invention applied thereto and in loading and discharging positions.

Fig. 7 is a transverse cross-section of a freight car, showing the loading mechanism of my invention applied thereto, and in uppermost and lowermost positions.

In its preferred form, the loading mechanism of my invention is especially applicable to a vehicle, and includes a standard which is either an original part of the vehicle itself or is applied thereto, to which is pivotally mounted a ladder forming a boom, together with mechanism such as a winch and cable for moving the boom in a vertical arc from a lowermost position in which the boom is constrained by a suitable stop mechanism such as cables, into an uppermost position wherein the boom is again moved against a stop so that a cradle, mounted at the outer extremity of the boom and designed to carry the load, will discharge the load gravitally. Preferably also, there is provided means, such as a hook, for latching the boom in uppermost position so that it can be used as a ladder.

Although the loading mechanism of my invention is susceptible of numerous different variations in accordance with the environment for which it is particularly designed, and since it is applicable to various different vehicles for each of which numerous relatively minor variations undoubtedly will be necessary, I have chosen to illustrate it herein in several different embodiments to illustrate the general field of application. Thus, for instance in Figs. 1 to 3, I have shown the device applied to a vehicle 6 which is of the type utilized generally by scavengers, and which includes a main frame 7 on which a high sided body 8 is mounted. This body is customarily constructed of sheet metal and is relatively rigid. For this reason I am enabled to utilize the body 8 as a standard for the mounting of my loading mechanism; therefore, I fasten to the body 8 in any suitable way a pair of brackets 9 carrying a pivot rod 11. Mounted on the pivot rod is a ladder 12, including a pair of longitudinal members 13 and 14, spanning which are rungs 16. This ladder acts as a boom and to that end is provided with a winch mechanism, generally designated 17, for moving the boom in a vertical arc. The winch mechanism preferably comprises a rotatably mounted wheel 18 which is secured to the side of the body 8, in this instance forming a standard, and has a hand crank 19 for manual operation. A cable 21 extends from the drum 17 over pulleys 22 and 23, respectively, to a suitable rung 16 on the boom. As the winch is operated, therefore, the ladder or boom is raised and lowered. The lowermost position of the boom is fixed by a pair of distance cables 26 and 27, which, as shown in Fig. 3, hold the boom in a generally horizontal lower position. At the outer extremity of the boom there is provided a cradle, generally designated 28, including frame members 29 and 31 supporting a cross-rod 32 to which and to the uppermost rung of the ladder is attached a sling 33 for the reception of a bundle 34, for instance. When the cradle is suitably loaded, the winch 17 is operated and the boom moves to its uppermost position relatively rapidly. It comes promptly against a stop 36, mounted on the body 8, and the abrupt stop of the cradle, together with its generally downward inclination, is successful in discharging gravitally the bundle 34 which has been carried thereby, into the body 8 of the vehicle. Preferably the boom is latched in its uppermost position by a latch 38 which is carried on a cross-shaft 39 mounted on the body 8, and is provided with an operating handle 41 for moving the latch against the urgency of a coil spring 42. This latch maintains the boom in uppermost position, despite vibration or jarring of the vehicle, and holds it securely in place for use as a ladder in the event the interior of the vehicle body is to be inspected.

As disclosed in Figs. 4 and 5, in the event the vehicle has a framework 71 which is not provided with an upstanding body, I preferably provide the same general ladder mechanism 72 as heretofore described, but preferably fasten it to a pair of standards 73 and 74 which act, together with the platform 76 of the vehicle and the vehicle frame 71, to provide standards for the mechanism. The upright 74 carries a winch 77 and likewise a latch mechanism 78. Distance cables 79 and 81 are likewise provided, as are pulleys 82 and 83. This structure, therefore, is seen to be in all regards equivalent to the structure of Figs. 1 to 3, except that it is supplemented by mechanism to fit it to a low body vehicle.

In Fig. 6 the structure is shown as applied to an airplane fuselage 81, to which the boom or ladder 82 is pivoted as at 83. This boom carries a cradle 84 at its outer end, for the reception of a pouch or sack 86 which discharges through a hatchway 87 in the upper portion of the fuselage 81. A pair of distance cables 88 hold the boom in its lowermost position, while an operating cable 89, fastened to a winch (not shown), affords the appropriate movement of the ladder or boom. The latching structure (not shown) is identical with those previously described.

As disclosed in Fig. 7, a standard car 91 has a hatchway 92 in the roof thereof, while to the side of the car there is pivotally fastened, as at 93, a suitable boom 94 carrying a cradle 96 at its outer end. The boom is fastened by distance cables 97 to the side of the car 91, while an operating cable 99 proceeds to a winch not shown. A latch mechanism, likewise not illustrated, holds the ladder or boom 94 in upright position, except when released.

In all of these devices it is contemplated that the boom or ladder will be moved from a generally horizontal loading position, through a vertical arc, into a substantially upright discharging position, with some considerable velocity, whereupon the boom will be promptly or abruptly checked in its upright position so that the load thereon, due to its momentum, will tend to proceed in the former path, which movement, supplemented by gravity, will be ample to discharge the load from the cradle. The latch automatically operates as the boom arrives at its upright position so that it cannot rebound and cause difficulties unless or until the latch is moved to released position. The device in all of the forms shown herein, as well as in the other modifications which readily suggest themselves, is of considerable benefit in handling relative heavy loads and moving them to considerable elevations, especially in loading or charging vehicles.

I claim:

1. A loading mechanism for a vehicle, comprising a boom including a pair of parallel members joined by cross-rungs, means for pivotally mounting said boom on said vehicle, a winch on said vehicle, a cable connecting said winch and said boom for moving said boom in a vertical arc, a cradle at the outer extremity of said boom arranged to discharge gravitally into said vehicle when said boom is in uppermost position, and a latch for holding said boom in uppermost position.

2. A loading mechanism for a vehicle, comprising a standard on said vehicle, a boom including a pair of parallel members joined by cross-rungs and at its lower end pivoted to the lower end of said standard, a winch mounted on said standard, a cable connecting said winch and one of said rungs of said boom for moving said boom in a vertical arc, means for stopping said boom in substantially a vertical position, and a cradle at the opposite end of said boom including a sling secured to one of said rungs and adapted to discharge gravitally when said boom is in substantially a vertical position.

3. A loading mechanism for a vehicle, comprising a ladder forming a boom and at one end pivoted by means of one of its rungs to said vehicle, a cradle secured to successive rungs at the other end of said ladder, means for moving said ladder in a vertical arc, and means engaging one of its rungs for latching said ladder in substantially vertical position.

4. A loading mechanism for a vehicle comprising brackets on said vehicle, a pair of substantially parallel longitudinal members, means for pivotally attaching said members to said brackets, a plurality of rungs spanning said members and therewith forming a boom, frame members rigidly secured to said longitudinal members adjacent the outer extremities thereof and together therewith forming a bundle-receiving cradle, and means for moving said boom with respect to said vehicle.

WILLIAM J. CONWAY.